(12) United States Patent
Ramaratnam et al.

(10) Patent No.: US 11,946,169 B2
(45) Date of Patent: Apr. 2, 2024

(54) PROCESS FOR MAKING A SPUNMELT NONWOVEN BATT OR WEB FROM RECYCLED POLYPROPYLENE

(71) Applicant: PFNONWOVENS LLC, Hazleton, PA (US)

(72) Inventors: Karthik Ramaratnam, Anderson, SC (US); John C. Parsons, Annville, PA (US); David John Pung, Loveland, OH (US); Anna Elizabeth Macura, Loveland, OH (US); Eric Bryan Bond, Maineville, OH (US)

(73) Assignee: PFNONWOVENS LLC, Hazleton, PA (US)

( * ) Notice: Subject to any disclaimer, the term of this patent is extended or adjusted under 35 U.S.C. 154(b) by 0 days.

(21) Appl. No.: 17/344,365

(22) Filed: Jun. 10, 2021

(65) Prior Publication Data

US 2021/0388535 A1 Dec. 16, 2021

Related U.S. Application Data

(60) Provisional application No. 63/037,122, filed on Jun. 10, 2020.

(51) Int. Cl.
*B01D 37/00* (2006.01)
*D01D 1/10* (2006.01)
(Continued)

(52) U.S. Cl.
CPC ............... *D01F 8/06* (2013.01); *D01D 1/106* (2013.01); *D01D 5/08* (2013.01); *D01F 6/06* (2013.01);
(Continued)

(58) Field of Classification Search
CPC ............... B01D 37/00; B29K 2023/12; B29K 2105/26; B32B 37/006; B32B 37/0084;
(Continued)

(56) References Cited

U.S. PATENT DOCUMENTS

| 5,315,367 A | 5/1994 | Salvador et al. |
| 5,443,898 A | 8/1995 | Gessner et al. |
(Continued)

FOREIGN PATENT DOCUMENTS

| EP | 3 320 330 | 1/2017 |
| EP | 3 356 589 A0 | 4/2017 |
| WO | WO-2019240899 A1 * | 10/2019 | .......... C08L 2207/20 |

OTHER PUBLICATIONS

PCT International Search Report dated Nov. 1, 2021 in connection with PCT International Patent Application No. PCT/US2021/36794.

*Primary Examiner* — Leo B Tentoni
(74) *Attorney, Agent, or Firm* — Amster, Rothstein & Ebenstein LLP

(57) ABSTRACT

A process for making a spunmelt nonwoven web including the steps of providing a mixture of recycled polypropylene, extruding the recycled polypropylene mixture to form a molten recycled polypropylene mixture, filtering the molten recycled polypropylene mixture through a filter to form recycled polypropylene filtrate, dosing the recycled polypropylene filtrate into the spunmelt production line by an amount of 80% to 100% by weight, passing the recycled polypropylene filtrate through at least one spinneret of the spunmelt production line to form filaments at a spinning speed of greater than 1200 meters per minute, cooling and drawing the filaments, and depositing the filaments on a moving belt to form at least one layer of the spunmelt nonwoven web made up of 80% by 100% by weight of recycled polypropylene fibers.

22 Claims, 2 Drawing Sheets

(51) Int. Cl.
*D01D 5/08* (2006.01)
*D01D 5/088* (2006.01)
*D01D 7/00* (2006.01)
*D01F 6/06* (2006.01)
*D01F 8/06* (2006.01)
*D04H 3/007* (2012.01)
*D04H 3/16* (2006.01)
*B29K 23/00* (2006.01)
*B29K 105/26* (2006.01)
*B32B 37/00* (2006.01)

(52) U.S. Cl.
CPC ............ *D04H 3/16* (2013.01); *B29K 2023/12* (2013.01); *B29K 2105/26* (2013.01); *B32B 37/0084* (2013.01); *B32B 2262/0253* (2013.01); *B32B 2305/20* (2013.01); *B32B 2305/70* (2013.01); *D10B 2321/022* (2013.01)

(58) Field of Classification Search
CPC ........ B32B 2262/0253; B32B 2305/20; B32B 2305/70; D01D 5/08; D01D 5/088; D01D 7/00; D01F 6/06; D04H 3/007; D04H 3/16; D10B 2321/022
USPC ............... 264/37.28, 37.32, 103, 169, 171.1, 264/172.19, 210.6, 210.8, 211, 211.13, 264/211.14, 911, 913, 920; 156/167, 181, 156/244.24, 324; 210/767
See application file for complete search history.

(56) References Cited

U.S. PATENT DOCUMENTS

| | | |
|---|---|---|
| 9,702,060 B2 | 7/2017 | Ferry et al. |
| 2001/0014395 A1 | 8/2001 | Mleziva et al. |
| 2002/0098764 A1* | 7/2002 | Mleziva ................. D01D 10/02 442/352 |
| 2003/0032357 A1* | 2/2003 | Gillespie ................. D04H 3/16 442/403 |
| 2003/0203698 A1 | 10/2003 | Gillespie et al. |
| 2011/0086568 A1* | 4/2011 | Standaert ................. D01F 6/06 442/401 |
| 2012/0009377 A1* | 1/2012 | Dodge, III ............ B32B 37/182 428/319.3 |
| 2016/0333509 A1 | 11/2016 | Novarino et al. |
| 2017/0002116 A1 | 1/2017 | Layman et al. |

* cited by examiner

PROCESS FOR MAKING A SPUNMELT NONWOVEN BATT OR WEB FROM RECYCLED POLYPROPYLENE

RELATED APPLICATIONS

This application claims priority to and the benefit of U.S. Provisional Application No. 63/037,122, filed Jun. 10, 2020 and entitled SPUNBOND RECYCLED POLYPROPYLENE NONWOVEN AND METHOD OF MAKING THE SAME, the contents of which are incorporated herein by reference in their entirety.

FIELD OF THE INVENTION

The present invention generally relates to nonwovens made of recycled polymeric material, and more particularly to spunbond nonwovens made of recycled polypropylene and methods of making the same.

BACKGROUND

In the production of nonwoven products, there are global market demands related to perseveration of the environment, including demands for sustainability, recycling, and prohibitions on "single-use plastics." To meet these demands, there is a need to produce nonwoven products with higher percentages of recycled materials, such as recycled polypropylene. Ideally, it would be most beneficial to produce a nonwoven with 100% recycled polymeric material.

A recycled product is a material made with recycled (recovered) materials. Such materials are waste streams that have been diverted from conventional disposal for another use. Recycled materials include both post-industrial and post-consumer waste stream. Post-industrial recycled (PIR) materials, otherwise considered as pre-consumer waste stream is essentially the waste generated from the original manufacturing process that is in-turn used for recycling. Post-consumer recycled (PCR) materials refers to everything that gets tossed into the recycling bin by a consumer. PCR is generally known to have higher levels of contamination and variability, due to additional life cycle of the product by the consumer and exposure of materials to uncontrolled conditions post manufacturing process.

Historically it has been believed and well-accepted in the industry that spinning such recycled materials comprising 100% recycled resin content for the manufacture of a spunbond nonwoven on a high-filament velocity spunbond line, such as the R3 and more recent versions manufactured by Reifenhauser (Reifenhäuser Reicofil, Troisdorf, Germany), is not commercially feasible as the spunbond nonwoven would contain too many defects and/or be too weak and not meet customer specifications. This reasoning was based on effects observed when recycled polypropylene resin was dosed into virgin resin, as a common commercial practice. In general, the dosage started at low levels (e.g., below 10% by weight of rPP), so that the spinning process remained stable, the number of defects was kept at a minimal rate and the resulting fabric properties were comparable to virgin PP fabric. With increased level of rPP in the product, the spinning becomes less stable and defects occur more frequently, up to a level that is unacceptable for commercial production. The industry in general accepted that the recycled material is of lower quality and can be dosed only in small amounts.

The industry belief is supported by the generally known fact that when polypropylene is exposed to thermal or mechanical stress, and particularly when exposed to both thermal and mechanical stresses, the polypropylene degrades. This is particularly problematic regarding both the spunmelt nonwoven production and regranulation processes, during which the polypropylene material is subject to combined thermal and mechanical stresses. As the number of cycles of such processes increases, the quality of the polypropylene material becomes increasingly diminished. In general, this diminishment in quality results from degradation of at least part of the polymeric molecule chain, producing relatively short molecule products (typically volatile) and solid carbonized or cross-chained residues. The degradation is a complicated process, resulting in many products including products from reactions with other substances.

To prevent the degradation, polymer producers tend to add thermal-stabilizers to virgin polypropylene. Each producer has its own composition. Additives may be incorporated into recycled polypropylene resin that is used to spin fibers. Such additives include stabilizers, antioxidants, and nucleating agents. Adding antioxidants to the polypropylene resin may further improve the long-term aging stability. Examples of antioxidants include, but are not limited to quinolein, such as trimethylhydroxyquinolein (TMQ); imidazole, such as zincmercapto toluyl imidazole (ZMTI); and conventional antioxidants, such as hindered phenols, lactones, and phosphites. The amount of antioxidants used may be up to 2%. Nucleating agents may include sodium benzoate, talc, or other chemicals. During the rPP regranulation, various types of polypropylene are typically mixed together (either various spunbond types, or spunbond and meltblown types together). This results in mixtures of stabilization packages or their residues which might result in unexpected issues during the regranulation and nonwoven production processes.

SUMMARY OF THE INVENTION

An object of the present invention is to provide a method for manufacturing a high quality spunbond nonwoven with a high level of recycled polypropylene (rPP) content. The rPP resin used in the production process meets the overall performance criteria expected of virgin resin, and the resulting nonwoven product has properties that are comparable to those of nonwovens made of virgin polypropylene.

Another object of the present invention is to provide a method for manufacturing a recycled polypropylene spunbond nonwoven in which the process is not significantly affected by a high rPP content. More specifically, even with a high rPP content, processes in accordance with exemplary embodiments of the present invention may still provide, for example, high throughput, low monomer exhaust fumes, a wide range of fiber denier, and a wide range of cabin pressure, to name a few.

According to an exemplary embodiment of the present invention, a process for making a spunmelt nonwoven web on a spunmelt production line comprises: providing a mixture of recycled polypropylene; extruding the recycled polypropylene mixture to form a molten recycled polypropylene mixture; filtering the molten recycled polypropylene mixture through a filter to form recycled polypropylene filtrate having a melt flow rate within a range of 20 g/10 min to 100 g/10 min as tested in accordance with ASTM 1238, the filter having a mesh size that is finer than a mesh size of a finest filter used in the spunmelt production line by a factor of at least 1.1; dosing the recycled polypropylene filtrate into the spunmelt production line by an amount of 80% to 100% by weight; passing the recycled polypropylene filtrate through at least one spinneret of the spunmelt production line to form filaments at a spinning speed of greater than 1200 meters per minute; cooling and drawing the filaments; and depositing the filaments on a moving belt to form at least one layer of the spunmelt nonwoven web made up of 80% by 100% by weight of recycled polypropylene fibers.

In an exemplary embodiment the melt flow rate of the recycled polypropylene filtrate is within a range of 25 g/10 min to 55 g/10 min as tested in accordance with ASTM 1238.

In an exemplary embodiment the filament spinning speed is within a range of 2000-3500 meters per minute.

In an exemplary embodiment the step of depositing comprises depositing the filaments on a moving belt to form a plurality of layers of the spunmelt nonwoven web, with at least one layer of the plurality of layers made up of 80% to 100% by weight of recycled polypropylene.

In an exemplary embodiment at least one layer of the plurality of layers is made up of recycled polypropylene by an amount that is less than 80% by weight.

In an exemplary embodiment the recycled polypropylene fibers have a linear mass density within the range of 0.8 to 3.0 denier.

In an exemplary embodiment the recycled polypropylene fibers have a linear mass density within the range of 1.4 to 1.9 denier.

In an exemplary embodiment the spunmelt nonwoven web has a basis weight within the range of 8 gsm to 90 gsm.

In an exemplary embodiment the spunmelt nonwoven web has a basis weight within the range of 10 gsm to 40 gsm.

In an exemplary embodiment the spunmelt nonwoven web has a machine direction tensile strength that is decreased not more than 20% as compared to a machine direction tensile strength of a spunmelt nonwoven web made with virgin polypropylene under the same process conditions.

In an exemplary embodiment the spunmelt nonwoven web has a cross direction tensile strength that is decreased not more than 20% as compared to a cross direction tensile strength of a spunmelt nonwoven web made with virgin polypropylene under the same process conditions.

In an exemplary embodiment the spunmelt nonwoven web has a machine direction tensile strength that is decreased not more than 15% as compared to a machine direction tensile strength of a spunmelt nonwoven web made with virgin polypropylene under the same process conditions.

In an exemplary embodiment the spunmelt nonwoven web has a cross direction tensile strength that is decreased not more than 15% as compared to a cross direction tensile strength of a spunmelt nonwoven web made with virgin polypropylene under the same process conditions.

In an exemplary embodiment the spunmelt nonwoven web contains recycled polypropylene by an amount of 80% to 100% by weight A spunmelt nonwoven web according to an exemplary embodiment of the present invention comprises: at least one layer made up of recycled polypropylene by an amount of 80% to 100% by weight, wherein the spunmelt nonwoven web has a machine direction tensile strength that is decreased not more than 20% as compared to a machine direction tensile strength of a spunmelt nonwoven web made with virgin polypropylene under the same process conditions, and the spunmelt nonwoven web has a cross direction tensile strength that is decreased not more than 20% as compared to a cross direction tensile strength of a spunmelt nonwoven web made with virgin polypropylene under the same process conditions.

In an exemplary embodiment the spunmelt nonwoven web is made on a spunmelt production line by a process comprising the steps of: providing a mixture of recycled polypropylene; extruding the recycled polypropylene mixture to form a molten recycled polypropylene mixture; filtering the molten recycled polypropylene mixture through a filter to form recycled polypropylene filtrate having a melt flow rate within a range of 20 g/10 min to 100 g/10 min as tested in accordance with ASTM 1238, the filter having a mesh size that is finer than a mesh size of a finest filter used in the spunmelt production line by a factor of at least 1.1; dosing the recycled polypropylene filtrate into the spunmelt production line by an amount of 80% to 100% by weight; passing the recycled polypropylene filtrate through at least one spinneret of the spunmelt production line to form filaments at a spinning speed of greater than 1200 meters per minute; cooling and drawing the filaments; and depositing the filaments on a moving belt to form at least one layer of the spunmelt nonwoven web made up of 80% by 100% by weight of recycled polypropylene fibers.

In an exemplary embodiment the at least one layer comprises a plurality of layers.

In an exemplary embodiment the spunmelt nonwoven web further comprises at least one other layer made up of recycled polypropylene by an amount of less than 80% by weight.

In an exemplary embodiment the spunmelt nonwoven web is made up of nonwoven fibers have a linear mass density within the range of 0.8 to 3.0 denier.

In an exemplary embodiment the nonwoven fibers have a linear mass density within the range of 1.4 to 1.9 denier.

In an exemplary embodiment the spunmelt nonwoven web has a basis weight within the range of 8 gsm to 90 gsm.

In an exemplary embodiment the spunmelt nonwoven web has a basis weight within the range of 10 gsm to 40 gsm.

In an exemplary embodiment the spunmelt nonwoven web has a machine direction tensile strength that is decreased not more than 15% as compared to a machine direction tensile strength of a spunmelt nonwoven web made with virgin polypropylene under the same process conditions.

In an exemplary embodiment the spunmelt nonwoven web has a cross direction tensile strength that is decreased not more than 15% as compared to a cross direction tensile strength of a spunmelt nonwoven web made with virgin polypropylene under the same process conditions.

In an exemplary embodiment the spunmelt nonwoven web contains recycled polypropylene by an amount of 80% to 100% by weight.

According to an exemplary embodiment of the present invention, a process for making a spunmelt nonwoven batt on a spunmelt production line comprises: providing a mixture of recycled polypropylene; melting the recycled polypropylene mixture to form a polymer melt via extrusion; filtering the polymer melt through a filter to form recycled polypropylene filtrate; forming recycled polypropylene (rPP) by solidifying the recycled polypropylene filtrate having a melt flow rate within a range of 30 g/10 min to 100 g/10 min as tested in accordance with ASTM 1238; dosing the rPP into the spunmelt production line by an amount of 80% to 100% by weight and melting the dosed material; passing the dosed material through at least one filter within the spunmelt production line, the ratio of the mesh of the filter used before the dosing to the mesh of a finest filter used in the spunmelt production line being at least 1.1; passing the rPP through a spinneret of the spunmelt production line to form filaments at a spinning speed of greater than 1200 meters per minute; cooling and drawing the filaments; and depositing the filaments on a moving belt to form a nonwoven batt made up of fibers comprising at least 80% by weight recycled polypropylene.

In an exemplary embodiment, the nonwoven batt is bonded to form a nonwoven web.

In an exemplary embodiment, during or after the step of depositing the filaments on a moving belt the nonwoven batt is laid onto at least one further layer of fibers and/or at least one further layer of fibers is formed and laid onto the nonwoven batt to form a multilayer nonwoven web.

In an exemplary embodiment, the melt flow rate of the rPP is within a range of 35 g/10 min to 55 g/10 min as tested in accordance with ASTM 1238.

In an exemplary embodiment, the filament spinning speed is within a range of 2000-3500 meters per minute.

In an exemplary embodiment, the recycled polypropylene fibers have a linear mass density within the range of 0.8 to 3.0 denier.

In an exemplary embodiment, the recycled polypropylene fibers have a linear mass density within the range of 1.4 to 1.9 denier.

In an exemplary embodiment, the spunmelt nonwoven has a basis weight within the range of 8 gsm to 90 gsm.

In an exemplary embodiment, the spunmelt nonwoven has a basis weight within the range of 10 gsm to 40 gsm.

A nonwoven web according to an exemplary embodiment of the present invention is produced by the previously described processes.

These and other features and advantages of the present invention will be presented in more detail in the following detailed description and the accompanying figures which illustrate by way of example principles of the invention.

DESCRIPTION OF THE DRAWINGS

The features and advantages of exemplary embodiments of the present invention will be more fully understood with reference to the following detailed description when taken in conjunction with the accompanying figures, wherein.

DETAILED DESCRIPTION

Figure 1:
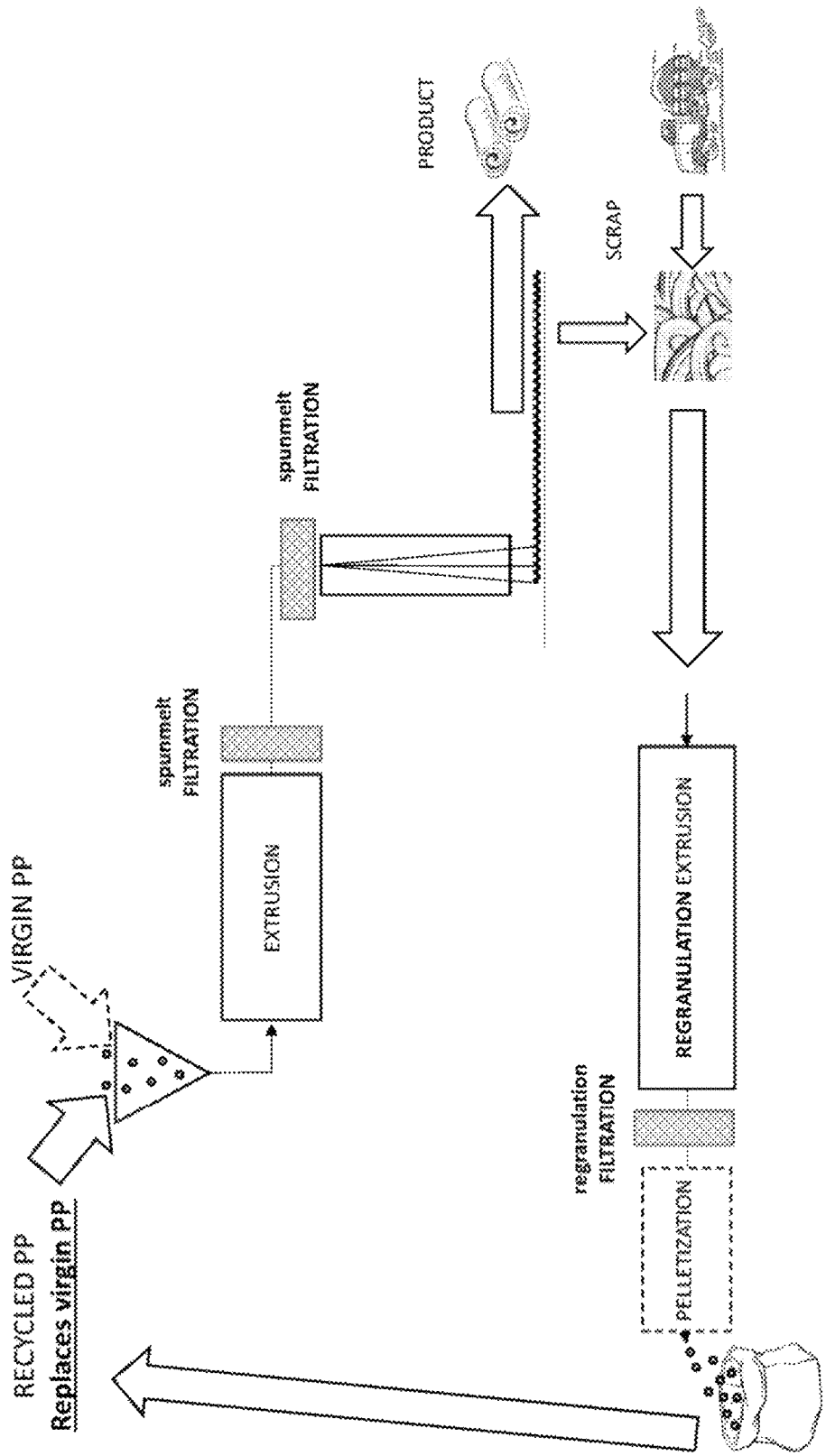
FIG. 1 is a block diagram showing a process for forming a spunmelt nonwoven according to an exemplary embodiment of the present invention.
Figure 2D:
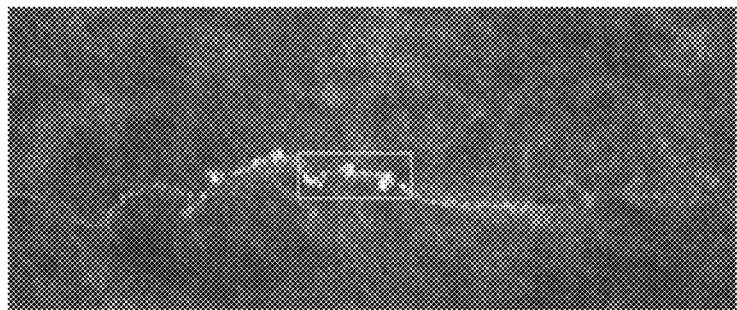
FIGS. 2A-2D are micrographs showing examples of fabric defects.
Figure 2C:
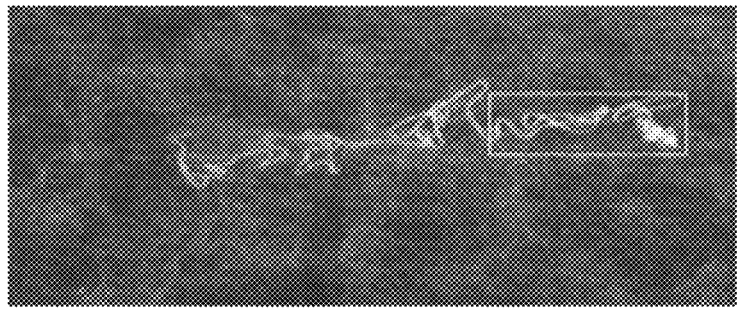
Figure 2B:
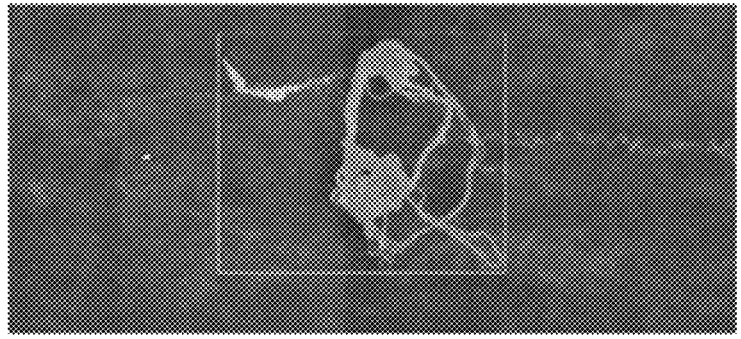
Figure 2A:
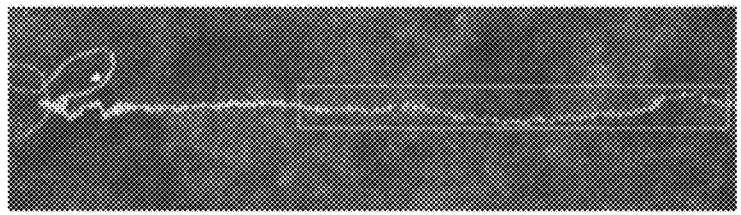

For the purposes of the present disclosure, the term "recycled polypropylene" (rPP) is intended to mean polypropylene resin that has been previously used in the manufacture of other products such as, but not limited to, fibers, nonwovens, filaments, films, solid plastic articles, and injection-molded components, and then has been converted back into pellets or other suitable form for the subsequent production of a spunbond nonwoven. Recycled polypropylene made in accordance with the processes described herein are in general intended to fulfil the standard requirements for spunbond polyolefin (e.g., color stability, pellet size, melt flow rate, thermostability or other requirements) set by spunmelt nonwoven production companies for their production lines.

Exemplary embodiments of the present invention focus on the use of recycled polyolefin product, more specifically recycled polypropylene product that could be derived either from post-industrial or post-consumer based recycle streams. Depending on the recycled material origin, PIR or PCR, additional process steps may be added to maintain manufacturing process efficiency or finished product/material quality. Such process steps may include but are not limited to, additional filtration measures to remove excess contamination, adding thermal stability additives and/or shortening the polymer chain of recycled resin produced from such feedstocks via visbreaking to maintain consistent resin MFR and uniform quality. Such visbreaking chemistry is widely available in the form of polymer additives and one such commercial product is Irgatec® sold by BASF (Ludwigshafen, Germany) as a polymer rheology modifier.

In accordance with exemplary embodiments of the present invention, a recycled polypropylene nonwoven is made by a spunbond process, where the amount of recycled polypropylene in the nonwoven is at 80% to 100% by weight. Surprisingly, it has been found that when the content of rPP in the fiber composition is increased to a high level, the spunbond spinning process is more stable and the frequency of defects decreases to an acceptable level. Without being bound by the theory, it is believed that a blend of virgin polypropylene and recycled polypropylene can be viewed in terms of interactions between the two. Specifically, when recycled polypropylene, which contains degradation products and residues, is added to virgin polypropylene, certain interactions take place. At low levels of rPP, the interaction effect is not strong enough to significantly influence the spinning process. In this regard, an rPP concentration of up to approximately 10-15% by weight is widely used in the industry. With increasing level of rPP in the composition, the interaction becomes stronger and the negative influence on the spinning process becomes obvious. However, when the rPP content reaches a high level (for example, higher than 80% by weight), the concentration of virgin PP decreases so much that the interaction influence on spinning becomes insignificant again. In the case of 100% rPP, there is no interaction, and the production process is more stable.

An rPP nonwoven according to exemplary embodiments of the present invention may be made up of monocomponent, bicomponent and/or multicomponent (i.e., more than two components) fibers. In this regard, all polypropylene components of the fibers preferably include recycled polypropylene, with the average content of recycled polypropylene across all fibers being within the range of 80% to 100% by weight, more preferably 90% to 100% by weight and more preferably 100% by weight. For example, regarding nonwovens made of monocomponent fibers, the average content of rPP across all monocomponent fibers may be within the range of 80% to 100% by weight, more preferably 90% to 100% by weight and more preferably 100% by weight. As a further example, regarding bicomponent fibers, where both components are made from polypropylene and both components contain rPP, the average content of rPP across all bicomponent fibers may be within the range of 80% to 100% by weight, more preferably 90% to 100% by weight and more preferably 100% by weight. As a further example, regarding multicomponent fibers made up of PP components and non-PP components, the average content of rPP across all PP components in the fiber may be within the range of 80% to 100% by weight, more preferably 90% to 100% by weight and more preferably 100% by weight. The rPP content across all PP and non-PP components of a multicomponent fiber would depend on the fiber composition. For example, fiber with a 50% by weight PE component and a 50% by weight PP component, with rPP content of the PP component being 80% to 100% by weight, would have an overall rPP content of 40% to 50% by weight. It should be appreciated that one of ordinary skill in the art would contemplate other variations in the number and content of fiber components with the amount of rPP within the inventive range.

In exemplary embodiments, a layered product may be made up of nonwoven batts or layers, with the amount of rPP in each batt or layer being the same or different. For example, a layered product according to the invention may contain one nonwoven batt with 80% to 100% by weight rPP content and another batt with no rPP content. This would result in the overall content of rPP across the fabric being less than 80% to 100% by weight, with at least one nonwoven batt with 80% to 100% rPP content.

Various additives may be added to the polymer fiber blends. Examples include additives intended to achieve a desired product feature (e.g., color additives), additives intended to achieve process advantages, and additives intended to achieve both product features and process advantages (e.g., certain slip additives that function as silk-touch enhancers). Without being bound by theory, when spinning at low levels of rPP, it is believed that additives added into the process at even small amounts can increase the interaction between rPP and virgin polypropylene and therefore exacerbate the negative effect of such interaction on the spinning process. On the contrary, the add on of relatively small amounts of additive to a blend with a high content of rPP does not affect the interaction significantly and therefore does not have a significant negative influence on the spinning process.

For the purposes of the present disclosure, it should be understood that nonwoven fibers described as being 100% by weight rPP may contain additives carried on a virgin polypropylene carrier. Similarly, 90% by weight rPP content should be understood to mean that 10% by weight of virgin polymer had been added to the composition apart from any additive that can also contain virgin PP carrier. The same applies to other percentages of rPP and virgin polypropylene. In exemplary embodiments, up to 10% by weight of additives may be added in total (apart from the rPP). For the purposes of the present disclosure, it should be also understood that input materials for nonwoven production can be provided in various forms, such as, for example, pellets. In exemplary embodiments, up to approximately 20% of nonwoven scrap can be added to the extruder. Dosing scrap nonwoven straight to the spunmelt production is well known in the industry (e.g., SIKOPLAST Maschinenbau Heinrich Koch GmbH, Aulgasse 176, 53721 Siegburg, Germany) and its content is counted as a part of recycled polypropylene in the fabric product. A typical non-straight scrap-dosing process involves regranulation of the polypropylene scrap and formation of pellets. It should be appreciated that the present invention is not limited to formation and use of pellets for the dosing of recycled polypropylene, and other exemplary embodiments may involve the use of recycled polypropylene into other forms such as, for example, flakes or powder.

Exemplary embodiments of the present invention involve the use of recycled polyolefin product, more specifically recycled polypropylene product (rPP) that could be derived either from post-industrial or post-consumer based recycle streams. Depending on the recycled material origin, PIR or PCR, additional process steps may need to be added to maintain manufacturing process efficiency and/or finished product/material quality. For a person skilled in the art, such process steps may include but are not limited to, sorting of scrap according to its content, properties or other characteristics, cleaning steps removing unwanted component of the mixture, additional filtration measures to remove excess contamination, adding thermal stability additives and/or visbreaking recycled resin produced from such feedstocks to maintain consistent resin MFR and uniform resin quality.

Visbreaking can be used in the extrusion system of the spunmelt production line, for example to increase rapidly the Melt Flow Rate of the polymer (to produce metblown fibers from spunbond polymer as described for example in European Patent No. EP3356589) or to improve the homogeneity of the polymer molecule chain lengths (as described in for example U.S. Pat. No. 9,702,060). A visbreaking process can be used at any extrusion step during spunmelt production or rPP preparation. It should be appreciated that one of ordinary skill in the art would contemplate other visbreaking agents and conditions of their use.

In exemplary embodiments, recycled polypropylene that contains certain additives may be eliminated from the spunmelt production process where such additives would have a detrimental effect. For example, regranulate from colored resin may be excluded, and additives such as erucamide are known to evaporate and exhaust from the polymer mixture at higher temperatures and therefore may be excluded. Each regranulate may be considered and either included or excluded according to requirements of the resulting product.

The overall performance criteria expected from a polymer and from recycled polymer can differ according to the individual product requirements, but some of them can be considered universal. For example, the melt flow index (MFR) of resin is one of the key features for virgin polymers. In general, the MFR of regranulated resin is expected to be slightly higher as compared to virgin polypropylene. One reason is the unavoidable level of polymer degradation (even at low levels), which increases the number of short-chain molecules in the polymer resin. The long molecules flow slowly, but short or shorter molecules between the long molecules act like a lubricant and cause the blend to flow faster. The regranulation of composite materials that contain certain levels of high MFR polymer with relatively shorter-chain molecules in the resin, such as spunbond-meltblown-spunbond (SMS) materials, may also contribute to the elevated levels of MFR. The amount and type of short or shorter-chain molecules influences the total MFR of the resin. MFR values as provided herein are determined in accordance with ASTM 1238.

In exemplary embodiments, a process for making a spunbond nonwoven may include providing recycled polypropylene pellets having a melt flow rate of at least 20 g/10 min, preferably at least 25 g/10 min, and more preferably at least 30 g/10 min, and may be no higher than 100 g/10 min, preferably no higher than 90 g/10 min, more preferably no higher than 80 g/10 min, more preferably no higher than 70 g/10 min, and even more preferably no higher than 60 g/10 min.

The higher resin MFR caused by a higher content of shorter molecule chains can also affect the mechanical properties of the final product (e.g., fiber or nonwoven). In this regard, the "lubricant" effect can be observed also in the solid state, where typically the strength might be slightly lower, and elongation might be slightly higher. A person skilled in the art will understand the importance of selecting a recycled polypropylene that has an MFR within a desired range to avoid detrimental effects to the spunbond process and diminishment of fabric properties. For the range of MFR discussed above, the diminishment of mechanical properties is not significant and/or the amount of very short polymer molecules (for example from meltblown-type polypropylene) is below a critical level.

A spunmelt nonwoven web made in accordance with exemplary embodiments of the present invention may have a machine direction tensile strength that is decreased not more than 20%, preferably not more than 15%, as compared to a machine direction tensile strength of a spunmelt nonwoven web made with virgin polypropylene under the same process conditions and a cross direction tensile strength that is decreased not more than 20%, preferably not more than 15%, as compared to a cross direction tensile strength of a spunmelt nonwoven made with virgin polypropylene under the same process conditions.

Purity is another important feature of a polymer resin. For the purposes of the present disclosure, the term "purity" should be understood to mean the level to which the polymer resin lacks contaminants. During the spunbond production process, the molten polymer after extrusion and before spinning is pressed though a screen-filter. Contaminants are caught by the filter-sieve and their presence complicates the passage of the resin flow. To maintain a constant throughput, the pressure of the flow must be increased in harmony with the level of filter clogging. When the pressure becomes too high, the screen-filter needs to be replaced. In general, the lower content of contaminants, the longer the life of the screen-filter, which is preferred from a production point of view. The speed of the pressure increase can be determined by a so-called "sieve test" or "filter test". It should be understood that a person of ordinary skill in the art would be capable of setting a critical pressure increase suitable for the corresponding spunmelt production line.

During the regranulation process, the resin is melted, and the melt is filtered before forming pellets. The common-sense approach would be to use the same sieve filter in the regranulation process as that used in the spunmelt production line to prevent shortening of the spunmelt production screen-filter life. However, using the same filter unexpectedly results in reduction in life of the spunmelt production screen-filter. Without being bound by theory, it is believed that this results from the partial resin degradation in the extrusion system. Specifically, the degradation residues (e.g., carbonized residues) or agglomerates (e.g., crosslinked molecules) depending on their quantity can increase the speed of screen-filter clogging and shorten the screen-filter life.

Surprisingly, improvement of filtration during the regranulation can limit this observed detrimental effect on filtration during the spunmelt process and prolong the screen-filter life to levels achieved when using only virgin polymer, or even longer. In this regard, a process for making a nonwoven according to exemplary embodiments of the present invention may include filtering the recycled polypropylene through a filter before conveying the recycled polypropylene through an extruder, where the filter has a mesh size of at least 350, preferably at least 400, more preferably at least 450, and even more preferably at least 500.

The mesh size of a filter describes the size of pores in the filter. The higher the mesh number, the smaller the pores and the higher the filtration effect. A person skilled in the art would appreciate that the filter and mesh sizes must be appropriately selected to achieve a desired polymer throughput and would also be able to determine a maximum mesh size for the applicable technology. In this regard, Table 1 below provides a sample listing of sieve mesh sizes and typical material filtered with each mesh size.

TABLE 1

| Sieve Mesh # | Inches | Microns | Typical Material |
|---|---|---|---|
| 14 | .0555 | 1400 | — |
| 28 | .028 | 700 | Beach Sand |
| 60 | .0098 | 250 | Fine Sand |
| 100 | .0059 | 150 | — |
| 200 | .0029 | 74 | Portland Cement |
| 325 | .0017 | 44 | Silt |
| 400 | .0015 | 37 | Plant Pollen |
| 1200 | .0005 | 12 | Red Blood Cell |
| 2400 | .0002 | 6 | — |
| 4800 | .0001 | 2 | Cigarette Smoke |

In general, spunmelt production lines contain several filtration points, with at least one, preferably two filtration points for each polymer flow that impact the spinning stability, including one directly after extrusion and a second before spinning on a spinneret. A polymer or polymer blend entering the extrusion system must proceed through the filter smoothly. It is expected that filtering the recycled polymer during regranulation on the same filter as used in spunmelt production line would be sufficient. However, surprisingly, the inventors have discovered that increasing the filtration level during regranulation increases the spinning stability on the spunmelt production line. In this regard, the filter mesh size of the filter used in the regranulation step is preferably at least 1.1 times larger than the mesh size of the finest filter used on the spunmelt production line (i.e., the regranulation filter has a mesh size that is finer than a mesh size of a finest filter used in the spunmelt production line by a factor of at least 1.1). For example, in exemplary embodiments, the regranulation filter mesh size may be 1.2, 1.4, 1.6, 1.8, or 2.0 times larger than the spunmelt filter size. Table 2 below provides filter mesh sizes in accordance with various exemplary embodiments of the present invention.

TABLE 2

| Finest mesh size on spunmelt production line | Mesh size used at regranulation step | | | | |
|---|---|---|---|---|---|
| | 1.1 | 1.2 | 1.6 | 1.8 | 2 |
| 100 | 110 | 120 | 160 | 180 | 200 |
| 150 | 165 | 180 | 240 | 270 | 300 |
| 200 | 220 | 240 | 320 | 360 | 400 |
| 250 | 275 | 300 | 400 | 450 | 500 |
| 300 | 330 | 360 | 480 | 540 | 600 |
| 350 | 385 | 420 | 560 | 630 | 700 |
| 400 | 440 | 480 | 640 | 720 | 800 |

As mentioned previously, conventional spunmelt processes involving the use of rPP result in products with an unacceptable level of defects. By contrast, the process according to exemplary embodiments of the present invention reduces the amounts of defects to an acceptable level, approaching the same level of defects achieved with virgin polypropylene. It should be appreciated that one of ordinary skill in the art would understand that defects in the nonwoven sheet occur from spinning, including but not limited to holes, drips, married fibers, quenching picks, hangers, MB fly and/or any other such defects. However, for the purposes of the present disclosure, the term "defect" is intended to refer to drips only. The defects can be detected by various methods, such as, for example, methods involving the use of camera detection systems. Suitable camera detection systems are described for example in U.S. Pat. No. 5,315,367 and European Patent No. EP3320330, the contents of which are incorporated herein by reference in their entirety. As a nonwoven is not a homogenous material in the millimeter scale, a quality control system may be tuned to detect any defect but ignore the normal inhomogeneity of the material. For the purposes of the present disclosure, a critical defect is any drip that has a surface area over 5 mm$^2$. FIGS. 2A-2D are micrographs showing examples of drip defects in a nonwoven material.

Defects in nonwoven fabrics are in general not acceptable, and if a critical defect is present, may result in the fabric being scrapped. For standard nonwoven products, it is commercially acceptable for the defect rate to be equal to or below 10 defects per one million square meters of produced nonwoven fabric. Those skilled in the art would understand that in certain situations a grouping of several defects may be considered a single defect. For example, when a relatively large drop falls from the spinneret, it is typically followed quickly by several small drops until the spinning stabilizes again. As another example, when a piece of dirt is caught in one capillary, the fiber from this capillary becomes unstable and lines of small drops in the MD direction can be observed until the capillary is cleaned or blocked. These lines of small drops may be considered a single defect. Also, defects may occur outside the standard production times, such as during line start-up, and such defects may be ignored in the determination of defect levels.

In exemplary embodiments of the present invention, a spunmelt nonwoven is made using input material made up of 80% to 100% by weight recycled polypropylene, with the number of defects present in the nonwoven being preferably less than 50 defects/one million m$^2$, more preferably less than 20 defects/one million m$^2$, and even more preferably less than 10 defects/one million m$^2$.

Without being bound by theory, it is believed that the spunmelt process is easier to stabilize for thicker fibers over 2 deniers. The fiber mass in this case is large enough to survive higher levels of non-homogeneities or contamination. In general, thicker fibers require a smaller drawing force (often expressed by cabin pressure) and thus express a lower spinning speed from the same capillary. On the contrary, finer fibers needs to be drawn with higher force, expressing higher spinning speed and resulting in a much smaller diameter. Conventionally, to ensure sufficient stability in production processes of spunmelt nonwovens involving use of recycled polypropylene, it is preferred to limit such processes to those that result in production of fibers of over 2 deniers in size, while using recycled PP in production of fibers below 2 deniers in size with spinning speeds over 1200 m/min is less preferable. Surprisingly, it has been found that the spunmelt techniques described herein involving the use of recycled polypropylene are suitable for production of fibers below 2 deniers at spinning speeds over 1200 m/min, preferably over 1300 m/min, more preferably over 1400 m/min, more preferably over 1500 m/min, even more preferably over 1750 m/min with advantage over 2000 m/min.

FIG. 1 is a block diagram of a system for making a spunmelt nonwoven according to an exemplary embodiment of the invention. As shown, spunmelt nonwoven fabrics are made of continuous strands or filaments that are laid down on a moving conveyor belt in a randomized distribution. In a typical spunmelt process, resin pellets are processed under heat into a melt through an extrusion process and then fed through spinnerets to create hundreds of thin filaments or threads by use of a drawing device. Jets of a fluid (such as air) cause the threads to be elongated, and the threads are then blown or carried onto a moving belt where they are laid down and sucked against the belt by suction boxes in a random pattern to create a fabric product. The fabric then passes through a bonding station where the web is formed prior to being wound on a winding/unwinding roll. In the process according to an exemplary embodiment of the invention, unused or defective product is discarded as scrap, and regranulated through a regranulation extrusion process. The regranulated polypropylene is then treated by, for example, a pelletizing process to form recycled polypropylene pellets (or some other form suitable for dosing into the spunmelt production line), which are used in place of the virgin polypropylene pellets used in the original process.

The following Examples and Comparative Examples illustrate advantages of the present invention. It should be appreciated that the present invention is not limited to the specific processes and resulting products as set forth in the Examples, and other such processes and products that achieve similar advantages as those illustrated herein are contemplated within the scope of the present invention.

Comparative Example 1

A 15 gsm spunmelt type nonwoven batt was produced online in a continuous process from one spunbond beams on a REICOFIL 4 line. The batt was made from 100% virgin polypropylene (type 3155E5 from ExxonMobile) having a melt flow rate of 36 g/10 min with a throughput of 180 kg/h/m. Monocomponent polypropylene filaments were produced with a filament speed of 2,909 m/min and an average linear density below 2 denier and subsequently collected on a moving belt. The strength of the batt was increased by passing it through a patterned calendar made up of a pair of heated rollers. The temperature of the calendar rollers (smooth roller/patterned roller) was 149° C./157° C. and the pressure was 76 N/mm.

Comparative Example 2

A spunmelt nonwoven batt was formed using the same process conditions as Comparative Example 1, with the exception that the line was dosed with 25% recycled polypropylene.

Comparative Example 3

A 10 gsm spunmelt type nonwoven batt was produced online in a continuous process using three spunbond beams on a REICOFIL 3 line. The batt was made from 100% virgin polypropylene (type Total PPH 3860 from TOTAL Petrochemicals) having a melt flow rate of 44 g/10 min with a throughput of 128 kg/h/m. Monocomponent polypropylene filaments were produced with a filament speed of 2,253 m/min with an average linear density below 2 denier and subsequently collected on a moving belt. The strength of the batt was increased by passing it through a patterned calendar made up of a pair of heated rollers. The temperature of the calendar rollers (smooth roller/patterned roller) was 149° C./157° C. and the pressure was 76 N/mm.

Comparative Example 4

A spunmelt nonwoven batt was formed using the same process conditions as Comparative Example 4, with the exception that the line was dosed with 10% recycled polypropylene.

Example 1

A 15 gsm spunmelt type nonwoven batt was produced online in a continuous process using 1 spunbond beams on a REICOFIL 4 line. The batt was made from 100% recycled polypropylene that was filtered during the regranulation process using a filter having a mesh size (375) that was finer than the finest mesh size used in the spunmelt line (325) by a factor of 1.15. The recycled polypropylene had a melt flow rate of 36 g/10 min with a throughput of 180 kg/h/m. Monocomponent polypropylene filaments were produced with a filament speed of 2,909 m/min and an average linear density below 2 denier and subsequently collected on a moving belt. The strength of the batt was increased by passing it through a patterned calendar made up of a pair of heated rollers. The temperature of the calendar rollers (smooth roller/patterned roller) was 149° C./157° C. and the pressure was 76 N/mm.

Example 2

A spunmelt nonwoven batt was formed using the same process conditions as Example 1, except that the throughput was 220 kg/h/m, the filament speed was 3,556 m/min and the resulting batt had a basis weight of 10 gsm.

Example 3

A 10 gsm spunmelt type nonwoven batt was produced online in a continuous process using three spunbond beams on a REICOFIL 3 line. The batt was made from 100% recycled polypropylene that was filtered during the regranulation process using a filter having a mesh size (375) that was finer than the finest mesh size used in the spunmelt line (325) by a factor of 1.15. The recycled polypropylene has a melt flow rate of 44 g/10 min with a throughput of 128 kg/h/m. Monocomponent polypropylene filaments were produced with a filament speed of 2,253 m/min with an average linear density below 2 denier and subsequently collected on a moving belt. The strength of the batt was increased by passing it through a patterned calendar made up of a pair of heated rollers. The temperature of the calendar rollers (smooth roller/patterned roller) was 149° C./157° C. and the pressure was 76 N/mm.

Example 4

A spunmelt nonwoven batt was formed using the same process conditions as Example 3, except that the 100% recycled polypropylene that was filtered during the regranulation process using a filter having a mesh size (600) that was finer than the finest mesh size used in the spunmelt line (325) by a factor of 1.85. The recycled polypropylene had a melt flow rate of 55 g/10 min Table 3 provides a comparison of spinning stability and fabric appearance for Comparative Examples 1 and 2 and Examples 1 and 2. Regarding Comparative Example 2, the 25% content of rPP in the virgin PP had a very negative influence on spinning stability. The spinning was not stable, which also affected fiber laydown. Many defects from spinning occurred, and the amount of drips was over a critical level. The final fabric appearance was bad as a result of both the defects and affected fiber laydown. By comparison, Examples 1 and 2 with 100% recycled polypropylene content had stable spinning with a homogenous fiber bundle and good laydown. The level of drips was below a critical level and fabric appearance was fully comparable to Comparative Example 1. The results obtained in Examples 1 and 2 show that the advantages of the present invention can be obtained over a range of throughput and filament speeds.

TABLE 3

| Example | rPP content | spinning | fabric - defects | spinning defects | fabric appearance |
|---|---|---|---|---|---|
| Comparative 1 | 0% | very good | minimal | low | very good |
| Comparative 2 | 25% | bad | high | high | bad |
| Inventive 1 | 100% | good | minimal | low | very good |
| Inventive 2 | 100% | good | minimal | low | very good |

Table 4 provides a comparison of a number of properties in regard to Comparative Examples 3 and 4 and Examples 3 and 4, which used a three-beam line. It should be understood that the spinning stability requirement for multibeam lines are stricter. Fabric appearance and spinning defect level are judged based on the final nonwoven web. If the web is produced from one beam, this one beam produces all defects. If the web is produced from 3 beams, statistically each beam can provide a maximum of ⅓ of the critical level of defects.

As shown in Table 4, the spinning stability of Comparative Example 3 (0% rPP) and Example 4 (10% rPP) was very good, with a minimal defect rate and very good fabric appearance. Examples 3 and 4, which involved production of a nonwoven web with 100% rPP, had spinning stability and fabric appearance that were fully comparable to Comparative Examples 3 and 4. The level of drips in Examples 3 and 4 were also below a critical level. The measured properties of each fabric produced in Comparative Examples 3 and 4 and Examples 3 and 4 were all within a desired range. Example 4 with higher factor of filtration (i.e., larger difference between regranulation and spinning filtration fineness) provided also longer filter life than Example 3.

TABLE 4a

| Example | rPP content | spinning | fabric - defects | fabric - properties | fabric appearance |
|---|---|---|---|---|---|
| Comparative 3 | 0% | very good | minimal | very good | very good |
| Comparative 4 | 10% | very good | minimal | very good | very good |
| Inventive 3 | 100% | very good | minimal | very good | very good |
| Inventive 4 | 100% | very good | minimal | very good | very good |

TABLE 4b

| Example | basis weight (gsm) | Air permeability (cfm) | MD Tensile Peak (g/cm) | MD Elongation Peak % | CD Tensile Peak (g/cm) | CD Elongation Peak % |
|---|---|---|---|---|---|---|
| Comparative 3 | 9.9 | 1204 | 489 | 70 | 229 | 75 |
| Comparative 4 | 10 | 1246 | 484 | 64 | 221 | 73 |
| Inventive 3 | 9.9 | 1224 | 503 | 58 | 213 | 64 |
| Inventive 4 | 9.9 | 1213 | 443 | 47 | 202 | 62 |

In exemplary embodiments, the basis weight of a nonwoven web or batt may be measured according to the European standard test EN ISO 9073-1:1989 (conforms to WSP 130.1). The basis weight test procedure may involve the use of 10 samples, with a sample area size of 10×10 cm².

In exemplary embodiments, the melt flow rate of a polymer is measured according to the USA standard ASTM 1238.

In exemplary embodiments, the tensile strength of a fabric or web is measured according to the WSP 110.4.R4 (12) standard.

In exemplary embodiments, the air permeability of a fabric or web is measured according to standardized testing methodology WSP 70.1. issued by the European Disposables and Nonwovens Association (EDANA). A 20 cm² head at a pressure of 200 Pa is used.

Definitions

The term "filament" refers to a principally endless fiber, while the term "staple fiber" refers to a fiber which has been cut to a defined length. Apart of the term "staple fiber" the terms "fiber" and "filament" are in this case mutually interchangeable.

The term "filament speed" herein refers to a number calculated from the fiber diameter (d), the polymer throughput on one capillary (Q) and the polymer density (p) of the filament:

$$v = \frac{4 \cdot Q}{\pi \cdot \rho \cdot d^2}$$

The term "monocomponent filament" or "monocomponent fiber" refers to a filament formed of a single polymer or polymer blend, as distinguished from a bicomponent or multicomponent filament.

"Multicomponent fiber" or "multicomponent filament" refers to a fiber or filament having a cross-section comprising more than one discrete section, where each of these sections comprises a different polymer component, or a different blend of polymer components, or polymer component and blend of polymer components. The term "multicomponent fiber/filament" includes, but is not limited to, "bicomponent fiber/filament."

"Fiber diameter" is expressed in units of µm. The terms "linear mass density" refers to "grams of fiber per 9000 m" (denier or den) or "grams of fiber per 10000 m" (dTex) and are used to describe the fineness or coarseness of fibers, which are related to the diameter (when assumed to be circular) by the density of the employed material(s).

"Machine direction" (MD)—with respect to the production of a nonwoven web material and the nonwoven web material, machine direction (MD) refers to the direction along the web material substantially parallel to the direction of forward travel of the web material through the production line on which the web material is manufactured.

"Cross direction" (CD)—with respect to the production of a nonwoven web material and the nonwoven web material, cross direction (CD) refers to the direction along the web material substantially perpendicular to the direction of forward travel of the web material through the production line on which the web material is manufactured.

The term "batt" or "nonwoven" or "nonwoven batt" refers to materials in the form of filaments that are found in the state prior to bonding, a process that can be performed in various ways, for example, air-through-bonding, calendaring etc. It is made up of individual filaments between which a fixed mutual bond is usually not yet formed even though the filaments may be pre-bonded/pre-consolidated in certain ways, where this pre-consolidation may occur during or shortly after the laying of the filaments in the spunlaying process. This pre-consolidation, however, still permits a substantial number of the filaments to be freely moveable such that they can be repositioned. The above mentioned "batt" may include several strata created by the deposition of filaments from several spinning beams in the spunlaying process.

A "nonwoven fabric" or "nonwoven web" is a manufactured sheet of directionally or randomly oriented fibers which are first formed into a batt or nonwoven and then consolidated together by friction, cohesion, adhesion and bonded thermally (e.g. air-through-bonding, calendar-bonding, ultrasonic bonding, etc.), chemically (e.g. using glue), mechanically (e.g. hydro-entanglement, etc.) or by combination thereof. The term does not include fabrics which are woven, knitted, or stitch-bonded with yarns or filaments. The basis weight of nonwoven fabrics is usually expressed in grams per square meter (gsm).

The "spunbond" process is a nonwoven manufacturing system involving the direct conversion of a polymer into continuous filaments, integrated with the conversion of the filaments into a random arrangement of laid filaments forming a nonwoven batt that is subsequently bonded to form a nonwoven fabric. The bonding process can be performed in various ways, for example, air-through-bonding, calendaring etc.

As used herein, the term "layer" refers to a sub-component or element of a nonwoven or web. A "layer" may be in the form of a plurality of fibers made on a single beam or on two or more consecutive beams, which produce substantially the same fibers. For example, two consecutively arranged spunbond beams with substantially the same settings and polymer compositions can together produce a single layer. In contrast, for example, two spunbond beams, where one produces monocomponent fibers and the other bicomponent fibers, will form two distinct layers. The composition of a layer can be determined either by knowing the individual settings and components of the resin (polymer) composition used to form the layer, or by analyzing the nonwoven itself, using, for example, optical or SEM microscopy or by analyzing the composition used to make the fibers of the layer using DSC or NMR methods.

The term "web" refers to an element that includes at least a fibrous layer or at least a film layer and has enough integrity to be rolled, shipped and subsequently processed (for example a roll of a web may be unrolled, pulled, taught, folded and/or cut during the manufacturing process of an article having an element that includes a piece of the web). Multiple layers may be bonded together to form a web.

While in the foregoing specification a detailed description of a specific embodiment of the invention was set forth, it will be understood that many of the details herein given may be varied considerably by those skilled in the art without departing from the spirit and scope of the invention.

The invention claimed is:

1. A process for making a spunmelt nonwoven web on a spunmelt production line, comprising:
providing a mixture of recycled polypropylene;
extruding the recycled polypropylene mixture to form a molten recycled polypropylene mixture;
filtering the molten recycled polypropylene mixture through a filter to form recycled polypropylene filtrate having a melt flow rate within a range of 20 g/10 min to 100 g/10 min as tested in accordance with ASTM 1238, the filter having a mesh size that is finer than a mesh size of a finest filter used in the spunmelt production line by a factor of at least 1.1;

dosing the recycled polypropylene filtrate into the spunmelt production line by an amount of 100% by weight;

passing the recycled polypropylene filtrate through at least one spinneret of the spunmelt production line to form filaments at a spinning speed of greater than 1200 meters per minute, the formed filaments being monocomponent, bicomponent or multicomponent filaments, all polypropylene components of the filaments comprising 100% by weight recycled polypropylene;

cooling and drawing the filaments; and depositing the filaments on a moving belt to form at least one layer of the spunmelt nonwoven web made up of 100% by weight of recycled polypropylene fibers.

2. The process of claim 1, wherein the melt flow rate of the recycled polypropylene filtrate is within a range of 25 g/10 min to 55 g/10 min as tested in accordance with ASTM 1238.

3. The process of claim 2, wherein the recycled polypropylene filtrate comprises stabilizers, antioxidants, or nucleating agents up to 2% by weight.

4. The process of claim 1, wherein the filament spinning speed is within a range of 2000-3500 meters per minute.

5. The process of claim 1, wherein the step of depositing comprises depositing the filaments on a moving belt to form a plurality of layers of the spunmelt nonwoven web, with the at least one layer of the plurality of layers made up of 100% by weight of recycled polypropylene.

6. The process of claim 1, wherein the recycled polypropylene fibers have a linear mass density within the range of 0.8 to 3.0 denier.

7. The process of claim 5, wherein the recycled polypropylene fibers have a linear mass density within the range of 1.4 to 1.9 denier.

8. The process of claim 1, wherein the spunmelt nonwoven web has a basis weight within the range of 8 gsm to 90 gsm.

9. The process of claim 1, wherein the spunmelt nonwoven web has a basis weight within the range of 10 gsm to 40 gsm.

10. The process of claim 1, wherein the spunmelt nonwoven web has a machine direction tensile strength that is decreased not more than 20% as compared to a machine direction tensile strength of a spunmelt nonwoven web made with virgin polypropylene under the same process conditions.

11. The process of claim 1, wherein the spunmelt nonwoven web has a cross direction tensile strength that is decreased not more than 20% as compared to a cross direction tensile strength of a spunmelt nonwoven web made with virgin polypropylene under the same process conditions.

12. The process of claim 1, wherein the spunmelt nonwoven web has a machine direction tensile strength that is decreased not more than 15% as compared to a machine direction tensile strength of a spunmelt nonwoven web made with virgin polypropylene under the same process conditions.

13. The process of claim 1, wherein the spunmelt nonwoven web has a cross direction tensile strength that is decreased not more than 15% as compared to a cross direction tensile strength of a spunmelt nonwoven web made with virgin polypropylene under the same process conditions.

14. A process for making a spunmelt nonwoven batt on a spunmelt production line, comprising:

providing a mixture of recycled polypropylene;

melting the recycled polypropylene mixture to a polymer melt via extrusion;

filtering the polymer melt through a filter to form recycled polypropylene filtrate;

forming recycled polypropylene by solidifying the recycled polypropylene filtrate having a melt flow rate within a range of 30 g/10 min to 100 g/10 min as tested in accordance with ASTM 1238;

dosing the recycled polypropylene into the spunmelt production line by an amount of 100% by weight and melting the dosed recycled polypropylene;

passing the dosed recycled polypropylene through at least one filter within the spunmelt production line, a ratio of the mesh of the filter used in the step of filtering the polymer melt to the mesh of a finest filter of the at least the one filter used in the spunmelt production line being at least 1.1;

passing the recycled polypropylene through a spinneret of the spunmelt production line to form filaments at a spinning speed of greater than 1200 meters per minute, the formed filaments being monocomponent, bicomponent or multicomponent filaments, all polypropylene components of the filaments comprising 100% by weight recycled polypropylene;

cooling and drawing the filaments; and depositing the filaments on a moving belt to form a nonwoven batt made up of fibers comprising 100% by weight recycled polypropylene.

15. The process of claim 14, wherein the nonwoven batt is bonded to form a nonwoven web.

16. The process of claim 14, wherein during or after the step of depositing the filaments on a moving belt the nonwoven batt is laid onto at least one further layer of fibers and/or at least one further layer of fibers is formed and laid onto the nonwoven batt to form a multilayer nonwoven web.

17. The process of claim 14, wherein the melt flow rate of the recycled polypropylene is within a range of 35 g/10 min to 55 g/10 min as tested in accordance with ASTM 1238.

18. The process of claim 14, wherein the filament spinning speed is within a range of 2000-3500 meters per minute.

19. The process of claim 14, wherein the recycled polypropylene fibers have a linear mass density within the range of 0.8 to 3.0 denier.

20. The process of claim 17, wherein the recycled polypropylene fibers have a linear mass density within the range of 1.4 to 1.9 denier.

21. The process of claim 14, wherein the spunmelt nonwoven has a basis weight within the range of 8 gsm to 90 gsm.

22. The process of claim 14, wherein the spunmelt nonwoven has a basis weight within the range of 10 gsm to 40 gsm.

\* \* \* \* \*